(12) United States Patent
Paull

(10) Patent No.: US 8,437,921 B2
(45) Date of Patent: May 7, 2013

(54) METHOD AND APPARATUS FOR CONTROLLING THE DEPTH OF CUT OF A TRACKHOE BUCKET

(76) Inventor: Philip Paull, Noblesville, IN (US)

( * ) Notice: Subject to any disclaimer, the term of this patent is extended or adjusted under 35 U.S.C. 154(b) by 382 days.

(21) Appl. No.: 12/876,080

(22) Filed: Sep. 3, 2010

(65) Prior Publication Data

US 2011/0056099 A1    Mar. 10, 2011

Related U.S. Application Data

(60) Provisional application No. 61/240,158, filed on Sep. 4, 2009.

(51) Int. Cl.
*G06F 19/00* (2011.01)
*G06F 7/70* (2006.01)

(52) U.S. Cl.
USPC .......................................................... 701/50

(58) Field of Classification Search .................... 37/347, 37/348, 413, 465, 466, 195; 172/2–11; 701/50.23, 701/36; 700/175, 180
See application file for complete search history.

(56) References Cited

U.S. PATENT DOCUMENTS

| | | | | |
|---|---|---|---|---|
| 5,727,387 | A * | 3/1998 | Hosseini et al. | 60/327 |
| 6,865,464 | B2 * | 3/2005 | Colburn | 701/50 |
| 6,990,390 | B2 * | 1/2006 | Groth et al. | 700/180 |
| 7,532,967 | B2 * | 5/2009 | Fujishima et al. | 701/50 |

\* cited by examiner

*Primary Examiner* — Robert Pezzuto
(74) *Attorney, Agent, or Firm* — Brannon Sowers & Cracraft PC

(57) ABSTRACT

An apparatus for controlling the depth of a hoe bucket, including a hoe bucket defining a cutting edge, an elongated member pivotably connected to the bucket, an actuator operationally connected to the elongated member, an electronic controller operationally connected to the actuator, and a position sensor operationally connected to the cutting edge and operationally connected to the electronic controller. The actuator may be energized to pivot the elongated member to a position adjacent the cutting edge for engaging ground, and positioning of the elongated member adjacent the cutting edge prevents the cutting edge from digging ground.

17 Claims, 12 Drawing Sheets

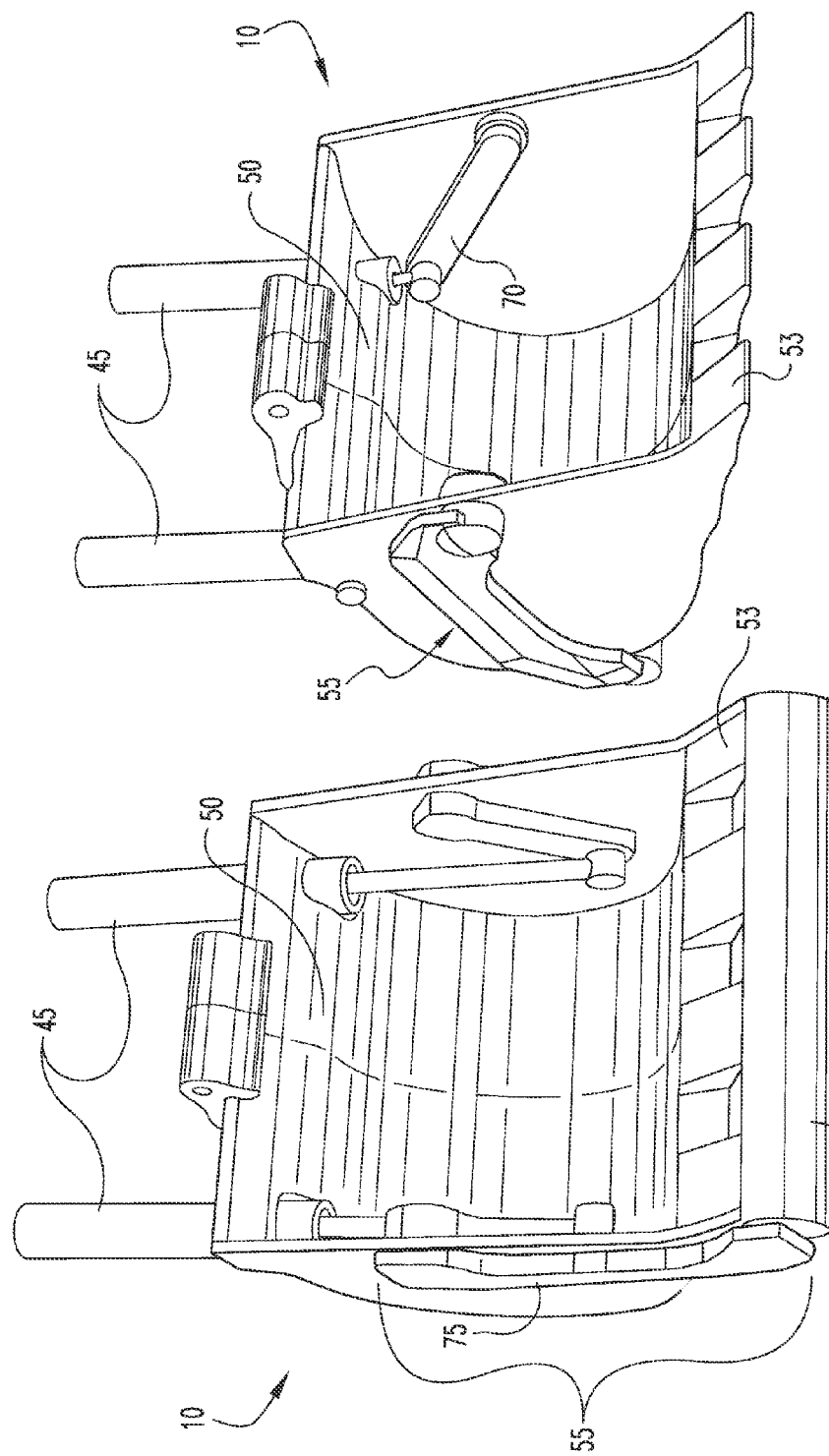

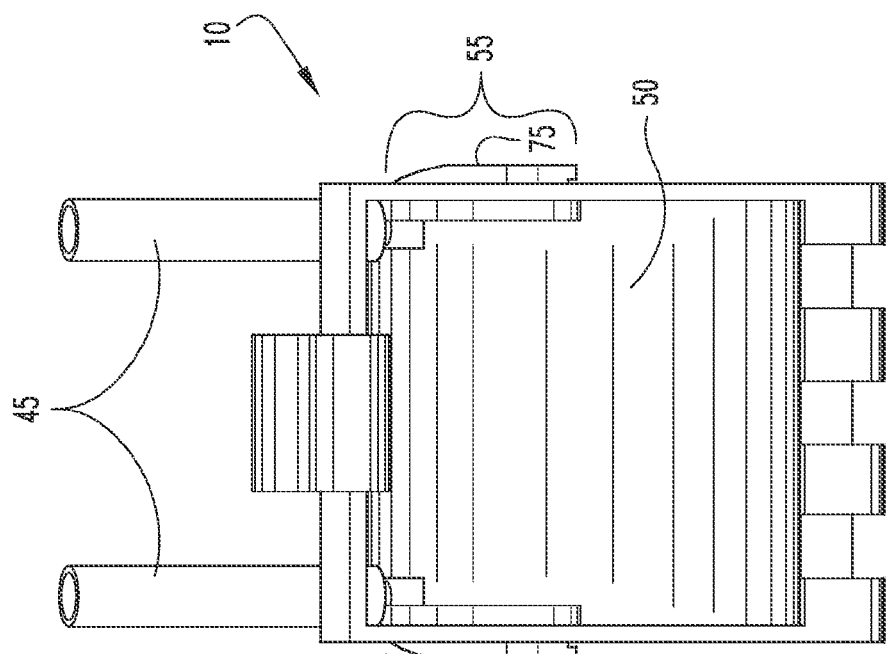
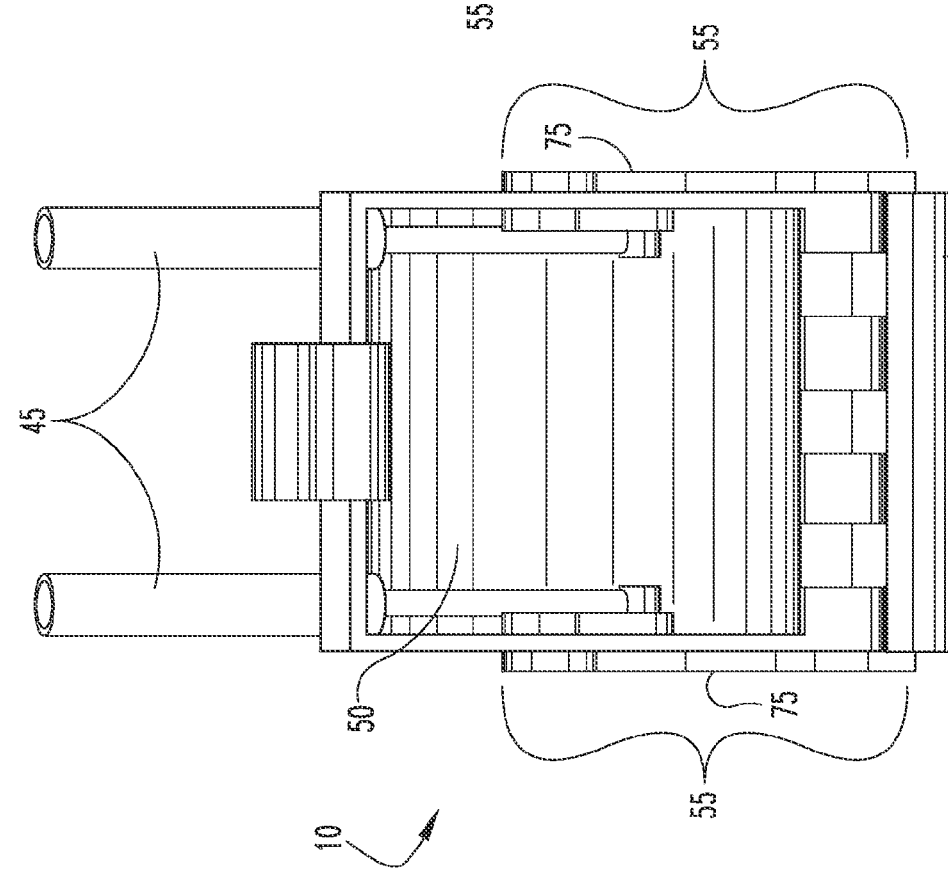
Fig. 6A
Fig. 6B

METHOD AND APPARATUS FOR CONTROLLING THE DEPTH OF CUT OF A TRACKHOE BUCKET

CROSS-REFERENCE TO RELATED APPLICATIONS

This patent application claims priority to U.S. Provisional Patent Application Ser. No. 61/240,158, filed on Sep. 4, 2009.

TECHNICAL FIELD

The present novel technology relates generally to the field of mechanical engineering, and, more particularly, to a method and apparatus for preventing a back hoe bucket from digging beyond a predetermined depth or grade.

BACKGROUND

Keeping on grade while digging with a back hoe continues to be a challenge even for the most experienced operators. More so than most digging machines, the extended lever arm of the hoe combined with the downward digging forces applied to produce wiggling and vibration of the hoe arm and bucket. Even experienced operators, having developed a tactile 'feel' for how well the bucket is digging and cutting, have difficulty maintaining grade, and the more precisely grade must be maintained, the more difficult and draining the job. While very good operators are able to maintain grade reasonably well even over prolonged digging sessions, the job does take its toll both physically and mentally.

Conventional laser alignment and even GPS guided devices have been developed to give the operator more reliable feedback regarding how close the digging bucket is to the desired grade. Such devices provide feedback to the operator that the bucket is too high, too low, or on grade at any given time during the digging operation. However, the operator must still receive and manually respond to the feedback signals (up or down) provided by the devices. Such constant correction of the bucket depth has proven to be physically demanding and exhausting.

Thus, there is a need for a system for automatically preventing overdigging and for automatically keeping the excavation on a predetermined grade. The present novel technology addresses this need.

SUMMARY

The present novel technology relates to a method and apparatus for maintaining a predetermined grade while digging with a back hoe. One object of the present novel technology is to provide an improved means for generating laser lines. Related objects and advantages of the present novel technology will be apparent from the following description.

BRIEF DESCRIPTION OF THE DRAWINGS

FIG. 4A is a perspective view of the bucket of FIG. 2 having the contact member engaged.

FIG. 4B is a perspective view of the bucket of FIG. 2 having the contact member disengaged.

FIG. 6A is a front elevation view of the bucket of FIG. 2 having the contact member engaged.

FIG. 6B is a front elevation view of the bucket of FIG. 2 having the contact member disengaged.

DETAILED DESCRIPTION OF THE PREFERRED EMBODIMENT

Figure 1:
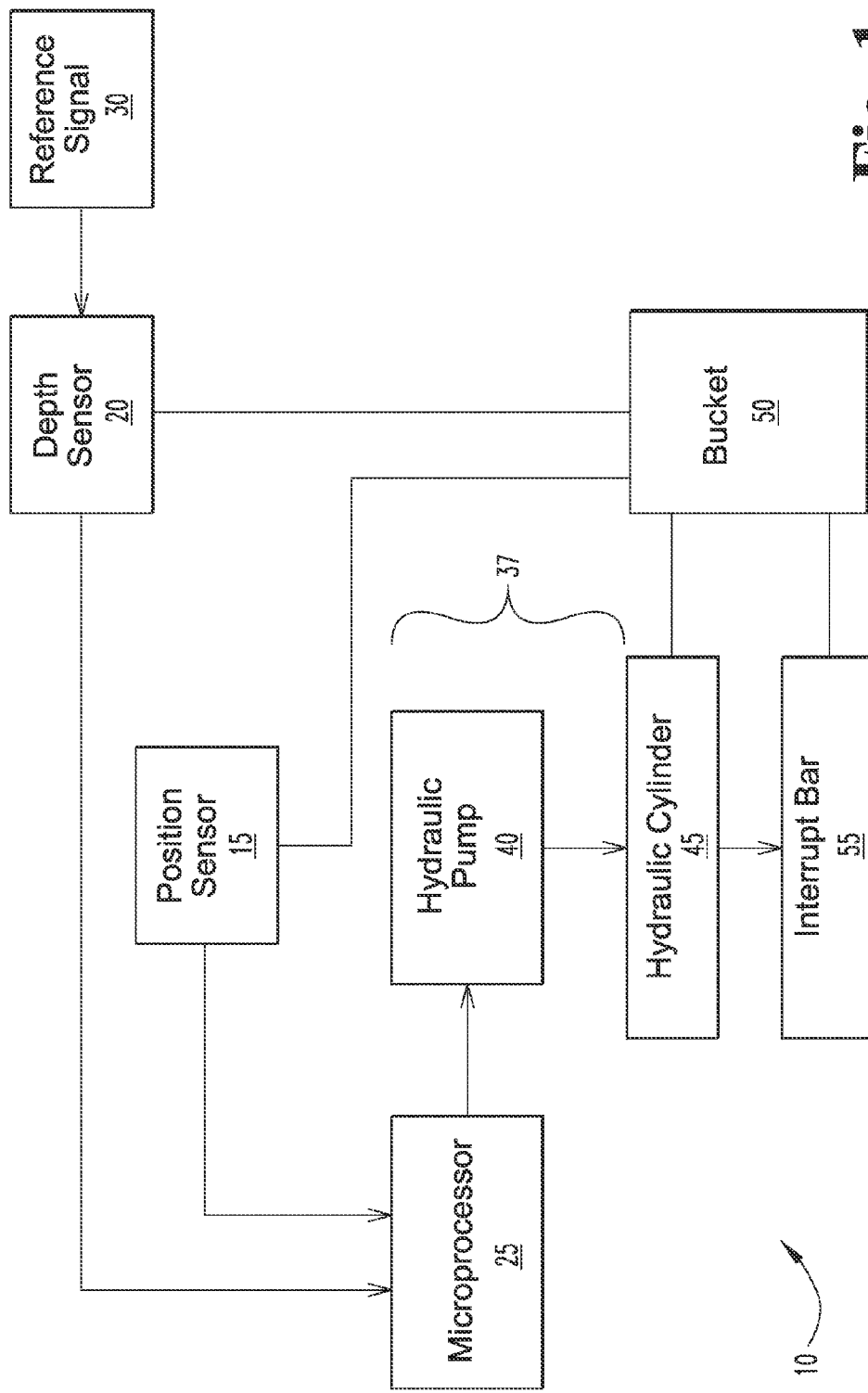
FIG. 1 is a schematic diagram of a first embodiment of the present novel technology, a system for automatically maintaining a back hoe bucket on grade during a digging operation.

For the purposes of promoting an understanding of the principles of the novel technology and presenting its currently understood best mode of operation, reference will now be made to the embodiments illustrated in the drawings and specific language will be used to describe the same. It will nevertheless be understood that no limitation of the scope of the novel technology is thereby intended, with such alterations and further modifications in the illustrated device and such further applications of the principles of the novel technology as illustrated therein being contemplated as would normally occur to one skilled in the art to which the novel technology relates.

A first embodiment of the present novel technology is illustrated in FIGS. 1 and 3-9C, a system 10 for automatically preventing a track hoe bucket, back hoe bucket, loader bucket, skid loader bucket or like bucket or shovel from digging substantially deeper than a predetermined grade depth parameter. While the following example and drawings focus on a hoe bucket, the claimed novel technology is not limited to a hoe system and includes other digging machines, such as front loaders and the like. The system 10 includes a position sensor 15 and a depth sensor 20 operationally connected to a microprocessor 25 and likewise connected in communication with a reference signal 30. The sensors 15, 20 may be separate, or may both be the same (such as a GPS transceiver). Further, some embodiments may only have a depth sensor 20, while others may only have a position sensor 15. The reference signal 30 may be from a GPS satellite, a laser, or the like.

The microprocessor 25 is also connected to an actuator assembly 37. The actuator assembly typically 37 includes a pressure source or pump 40, such as a hydraulic or pneumatic pump 40 is connected in fluidic communication with at least one hydraulic or pneumatic cylinder 45. The hydraulic cylinder 45 is fixedly, and typically pivotably, connected to a hoe or shovel bucket or blade 50 having a cutting edge or teeth 53. While actuator assembly 37 is described herein as being of the pressurized piston/cylinder type, actuator assembly 37 may likewise include other types of actuators, such as mechanical, electromechanical, or the like.

Bucket 50 is likewise connected to the distal portion of a hoe armature 51. The hydraulic cylinder 45 is also operationally connected to an interrupt bar 55, which is likewise pivotably connected to the bucket 50. The position and depth sensors 15, 20 are likewise operationally connected to the bucket 50 such that the depth of the bucket, and the cutting edge 53, is either directly measured (such as by direct attachment of the sensor(s) 15, to the bucket 50, or calculated (such as by connection of the sensor(s) 15, 20 to a predetermined position on the distal portion of the armature 51 connected to the bucket 50.

Figure 7:
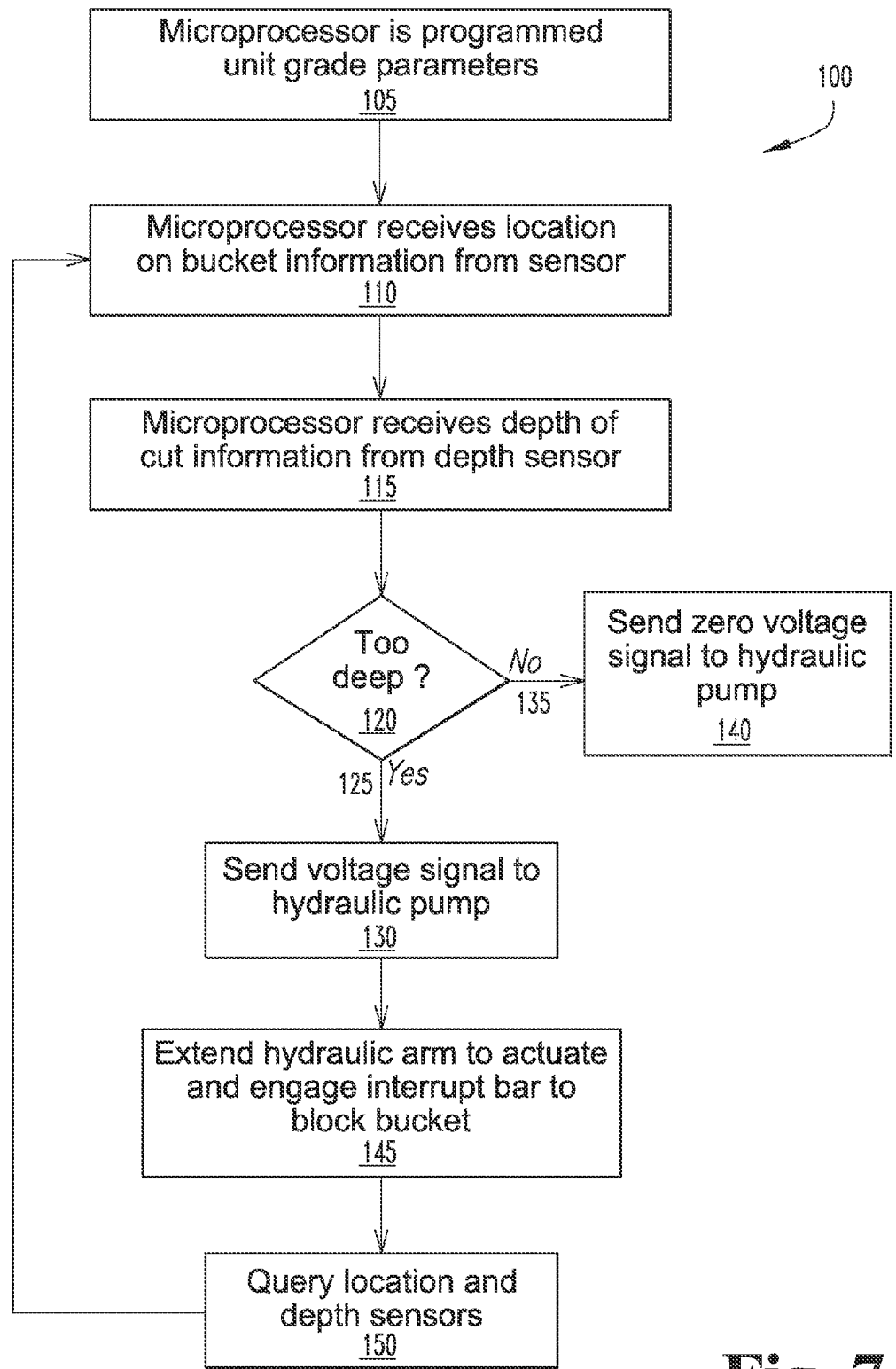
FIG. 7 is a schematic diagram of the process of FIG. 1.
Figure 8:
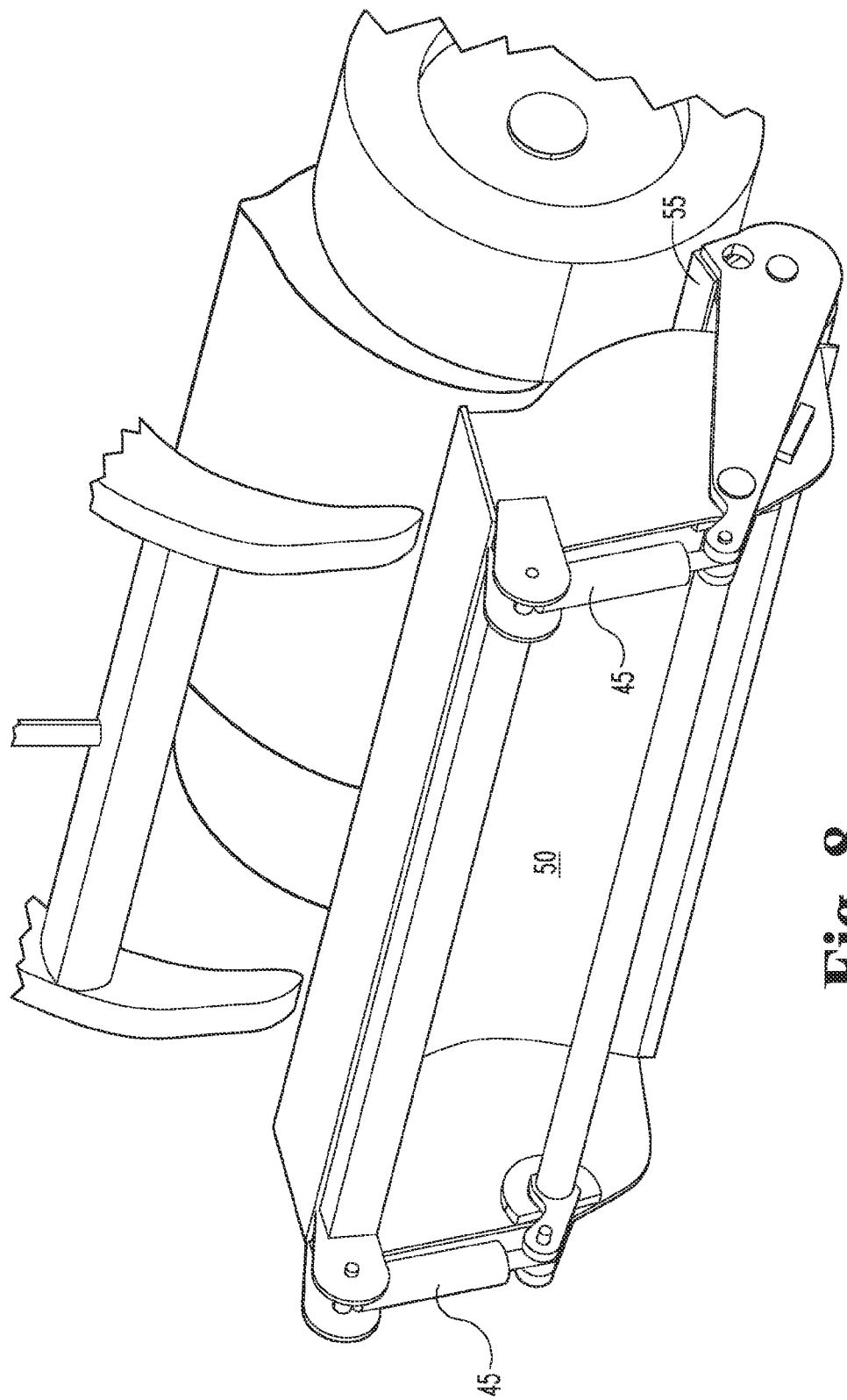
FIG. 8 a perspective view of a first embodiment system including an elongated bucket and interrupt bar assembly as connected to a skid loader.
Figure 9:
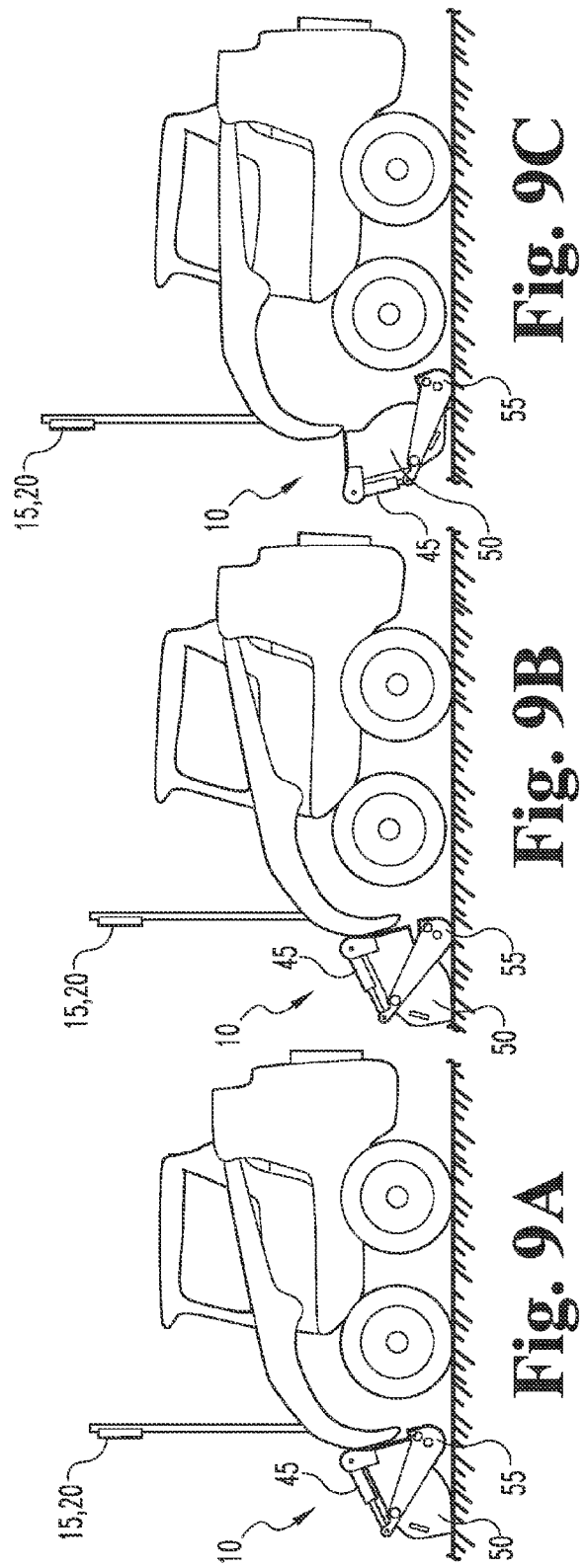
FIG. 9A is a schematic view of the loader of FIG. 8 with the interrupt bar positioned away from the cutting edge of the bucket.
FIG. 9B is a schematic view of the loader of FIG. 8 with the interrupt bar moved toward a deployed position adjacent the cutting edge of the bucket.
FIG. 9C is a schematic view of the loader of FIG. 8 with the interrupt bar in a deployed position adjacent the cutting edge of the bucket.
Figure 10:
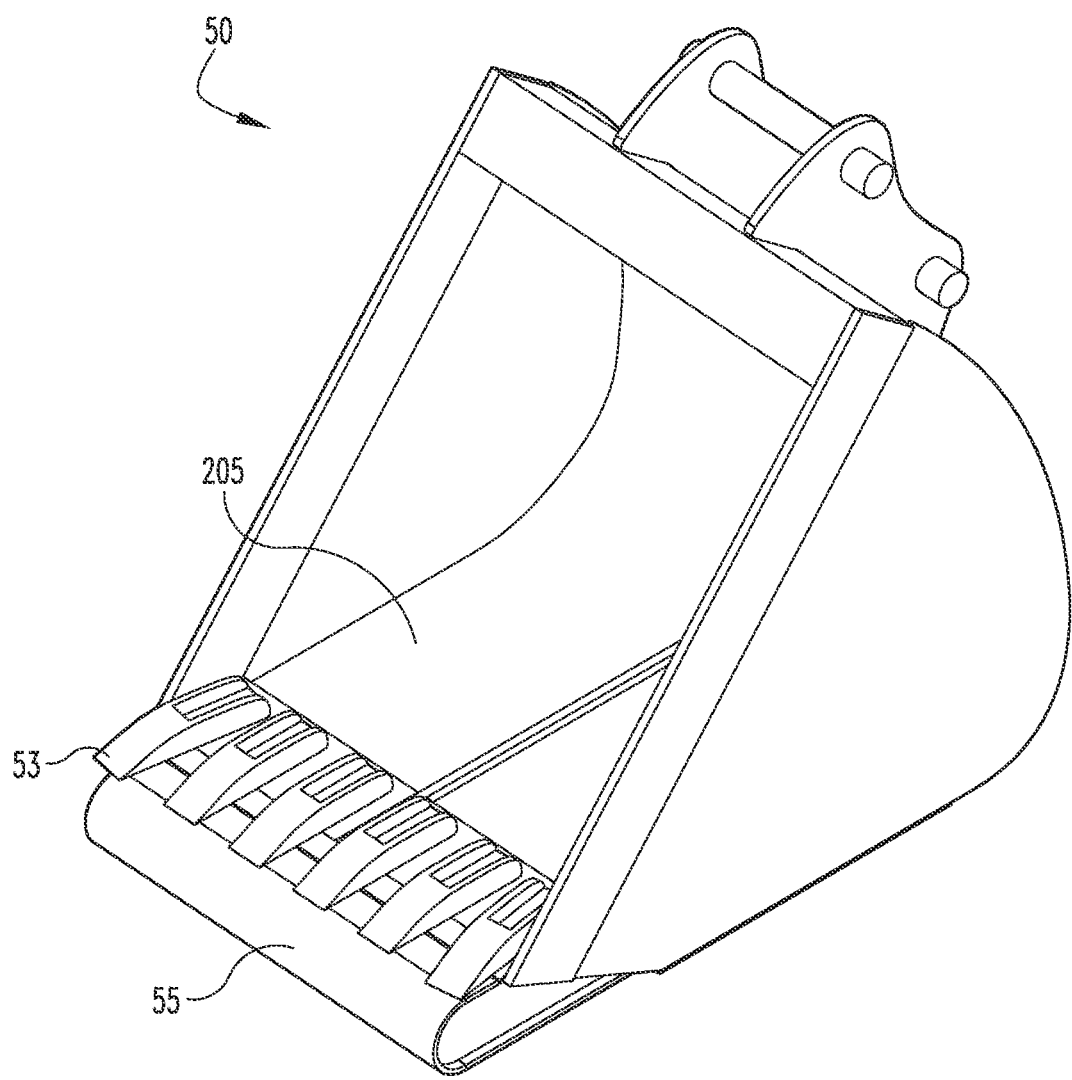
FIG. 10 is a front perspective view of another embodiment back hoe bucket according to the system of FIG. 2.
Figure 11:
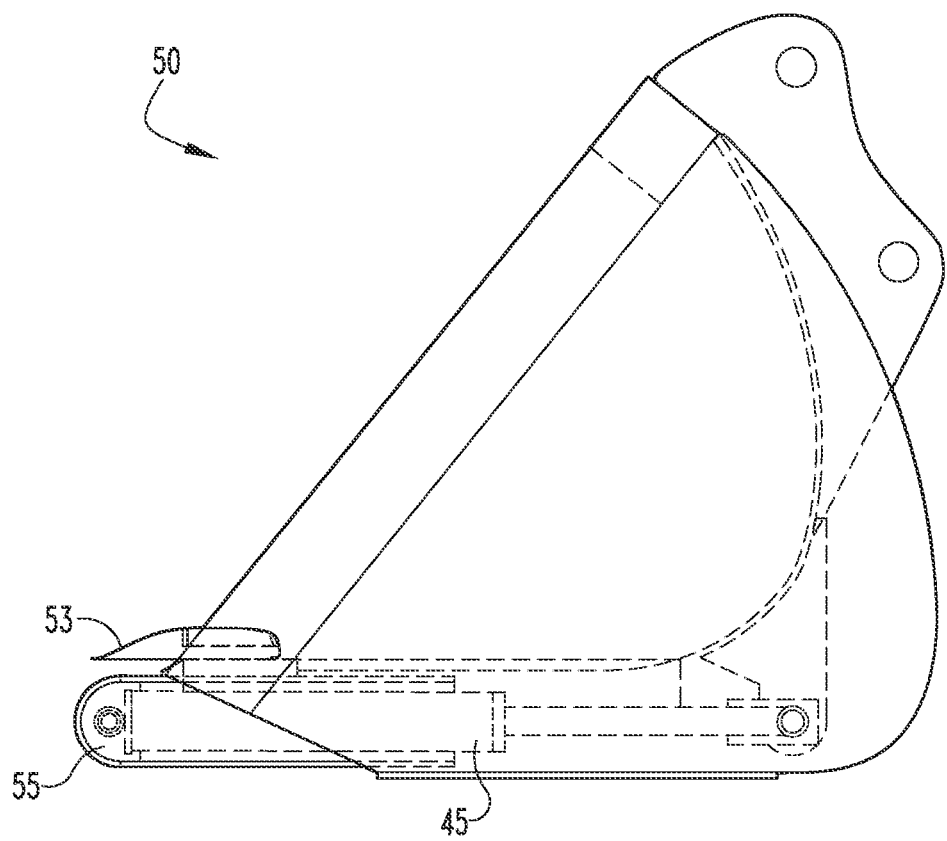
FIG. 11 is a partially cut away side elevation view of the bucket of FIG. 10.
Figure 12B:
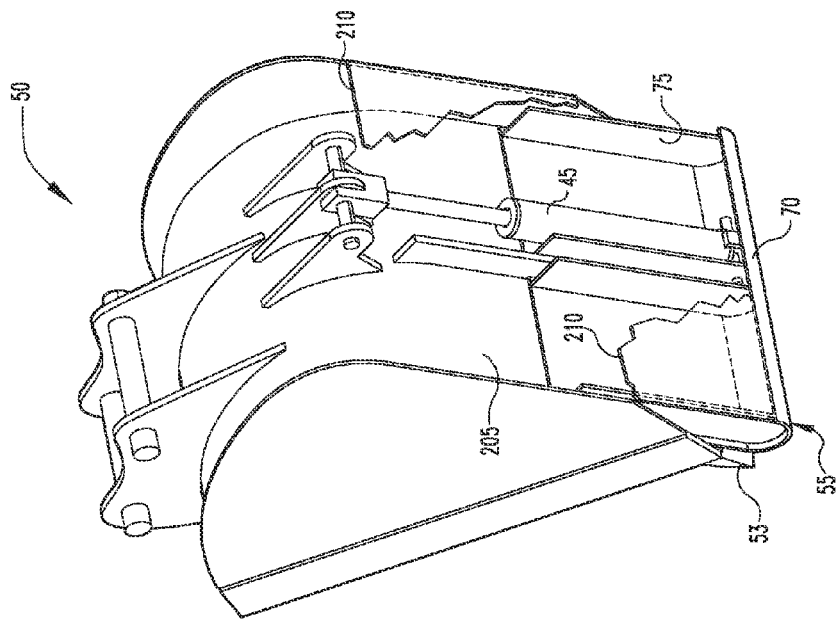
FIG. 12B is a partially cut away rear perspective view of the bucket of FIG. 10.
Figure 12A:
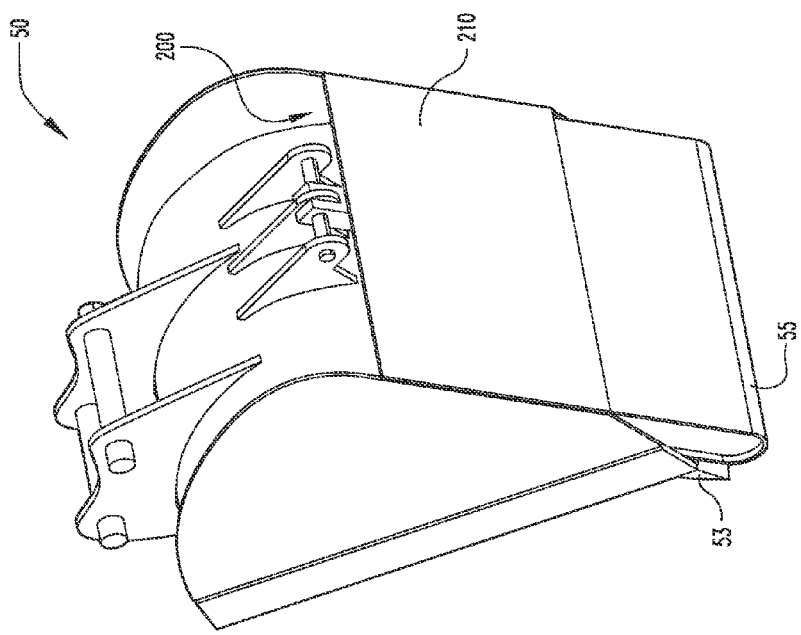
FIG. 12A is a rear perspective view of the bucket of FIG. 10.

In operation 100, as schematically illustrated in FIG. 7, microprocessor 25 is first programmed with the location and depth parameters of the grade or excavation to be dug 105. The reference signal 30 is received 110 by the depth sensor 20 and/or microprocessor when the digging machine is in operation, and the depth of the bucket 50 is calculated in substantially real-time. The location of the bucket 50 is also typically calculated from information supplied by the location sensor 15 and received 115 by the microprocessor 25. The depth and location information are used to calculate the position of the bucket 50 and this is compared 120 by the microprocessor 25 to the programmed grade information. If the bucket 50 begins exceed 125 programmed grade parameters, such as moving deeper than the programmed grade, an actuation signal 130, typically a voltage, is generated by the microprocessor 25 and sent to the hydraulic pump 40, energizing the pump 40 and actuating the cylinder 45 to extend 145 and pivot the interrupt bar 55 into position to engage the ground ahead of the bucket 50. This operation is shown sequentially in FIGS. 9A-9C, wherein the interrupt bar 55 connected to a skid loader bucket 50 is moved from a standby position (FIG. 9A) into an engaged position (FIG. 9C), preventing the bucket 50 from digging into the ground and, typically, slightly lifting the front end of the loader. If the bucket position does not exceed 135 the programmed grade parameters, a null signal 140 is sent to the pump 40. Engagement of the ground by the interrupt bar 55 prevents the shovel or bucket 50 from penetrating deeper into the ground. The microprocessor 25 may then query the sensors 15, 20 for bucket location information, and the cycle starts over. It should be noted that although the process of digging to grade is typically one of vertically removing dirt, the programmed grade may likewise be a substantially horizontal parameter, such as the walls of a dug basement.

The interrupt bar 55 is typically an elongated member made of a structural material, such as steel. The interrupt bar 55 is more typically rounded or generally cylindrical. The interrupt bar 55 is generally U-shaped, having an elongated and generally rounded middle portion 70 and parallel connection members 75 extending from either end of the middle portion at generally right angles from the axis of the middle portion 70. The middle portion 70 and connection members 75 may define a unitary piece (see FIGS. 10-12B), or may be connected together as separate pieces.

Figure 2:
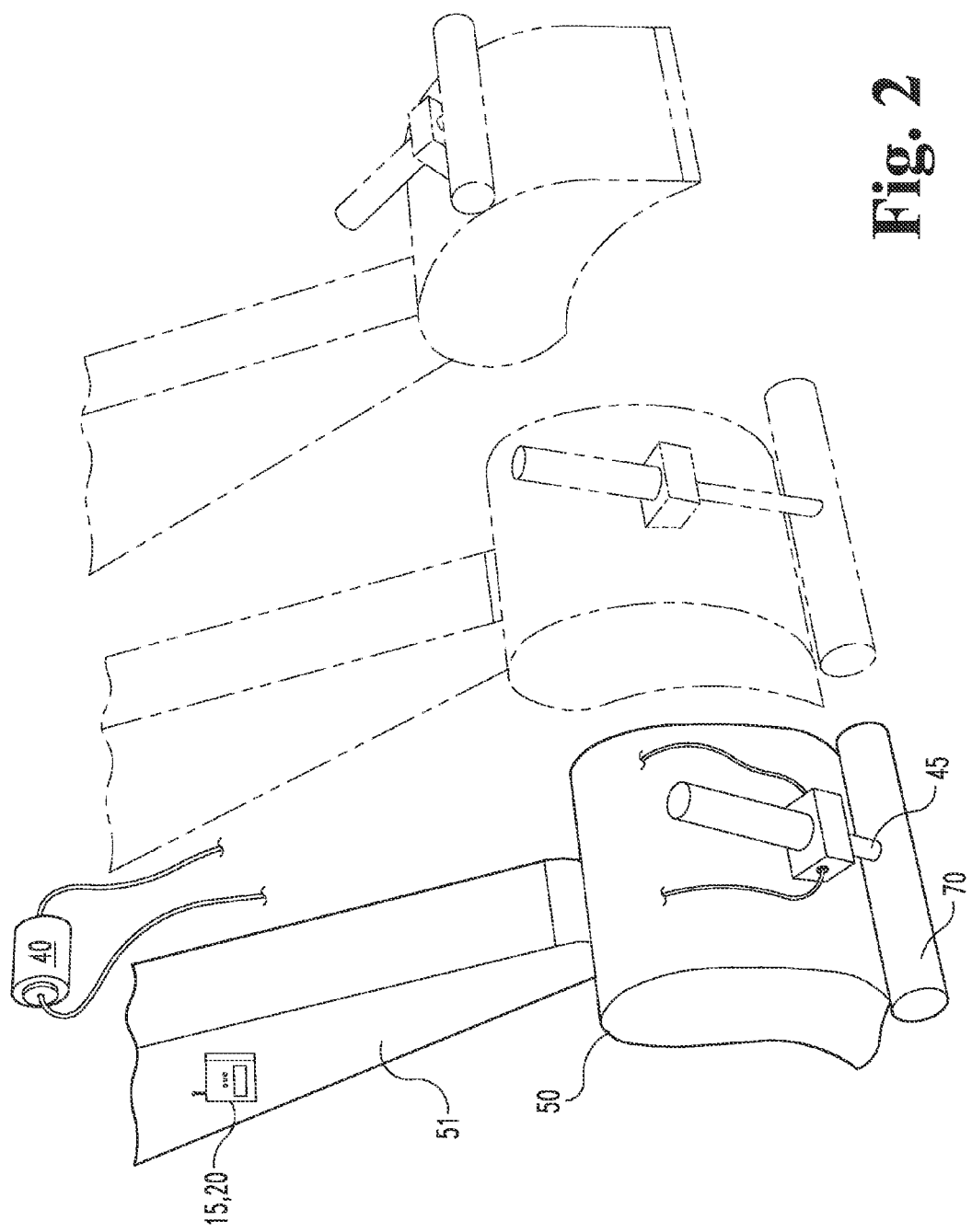
FIG. 2 is a perspective view of a second embodiment of the present novel technology, a system for automatically maintaining a back hoe bucket on grade during a digging operation.
Figure 3:
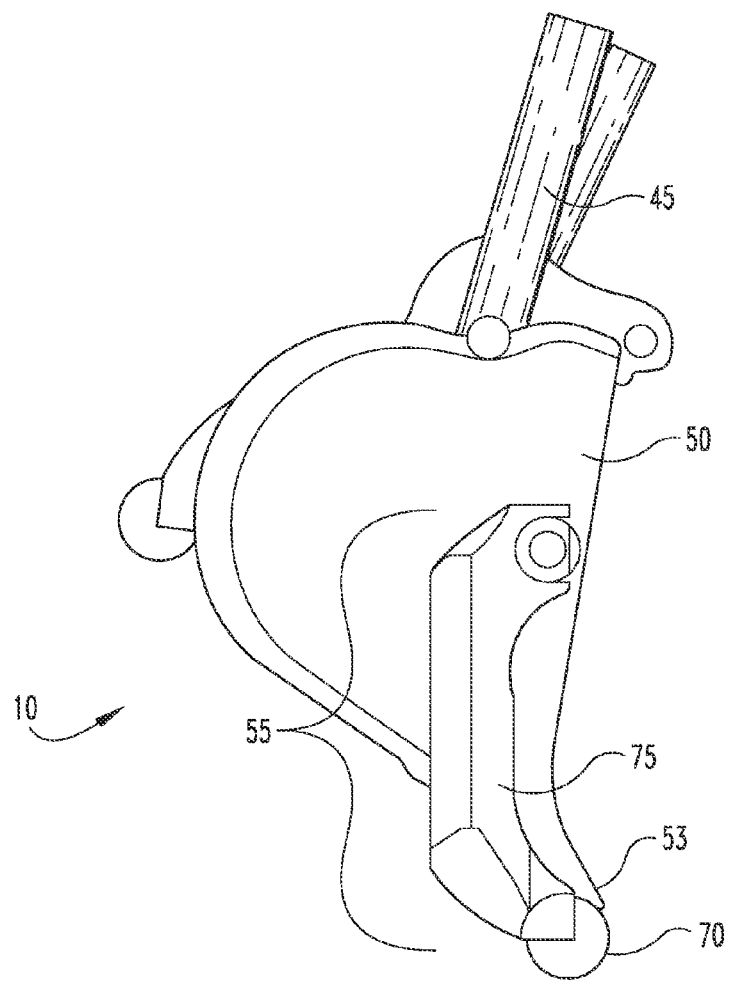
FIG. 3 is a side elevation view of a first embodiment back hoe bucket of the resent novel technology.
Figure 5B:
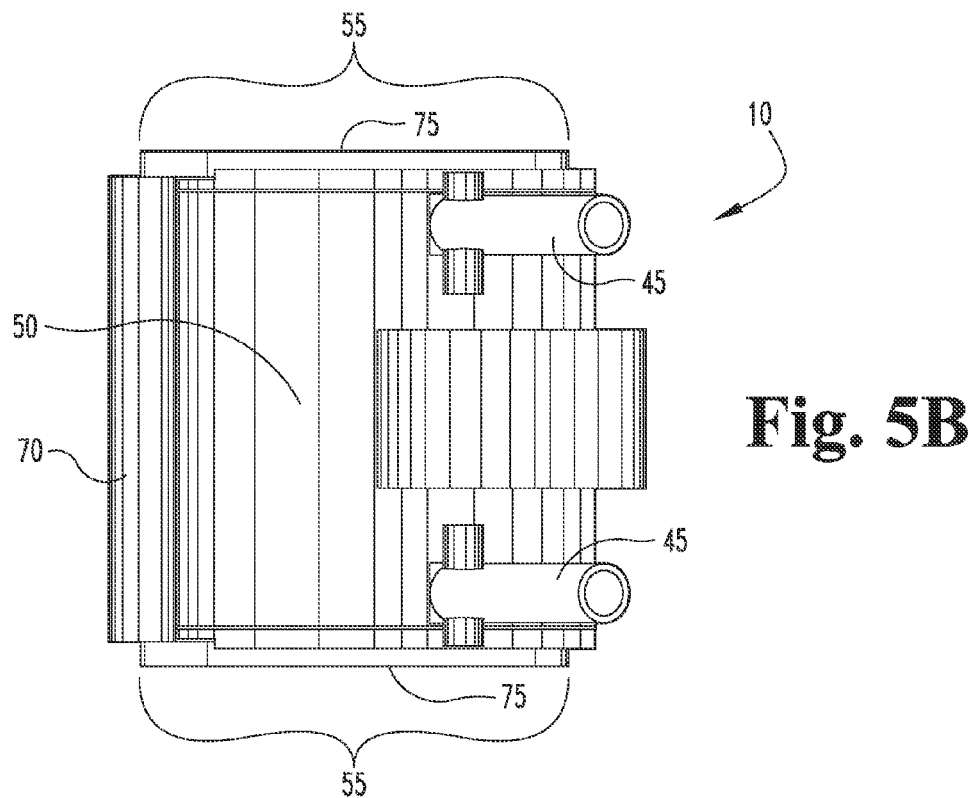
FIG. 5B is a top plan view of the bucket of FIG. 2 having the contact member disengaged.
Figure 5A:
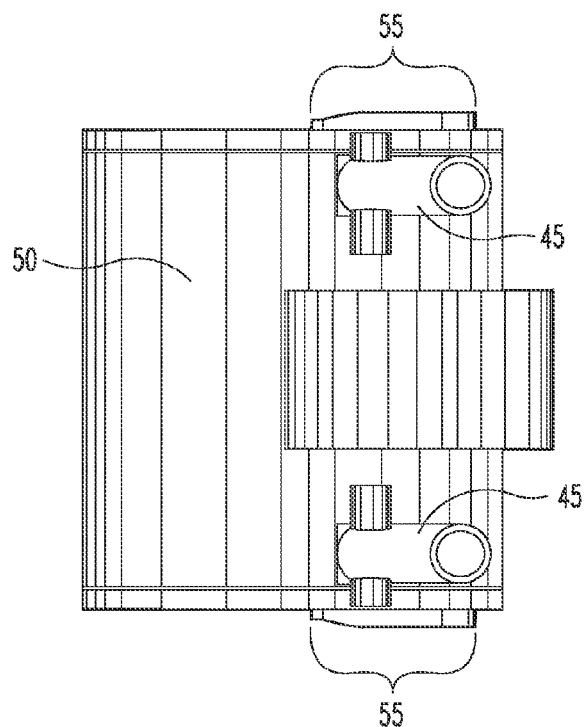
FIG. 5A is a top plan view of the bucket of FIG. 2 having the contact member engaged.

FIG. 2 illustrates one specific configuration of the system 10 wherein a single hydraulic cylinder 45 is used to pivot the interrupt bar 55, while FIGS. 3-9C illustrate a configuration wherein a pair of cylinders 45 are used. The cylinders 45 are illustrated as positioned in the interior of the bucket 50, but may likewise be positioned adjacent the exterior of the bucket 50.

FIGS. 10-12B illustrate a variation of the bucket 50 illustrated in FIG. 2 and discussed above, wherein the interrupt bar 55 and piston-cylinder actuator 45 are enclosed in a recess 200 formed in the bucket 50. In this embodiment, the recess 200 is defined by inner bucket wall 205 and outer bucket wall 201 which create the double-walled bottom portion or recess 200. The actuator 45 is positioned in the recess 200 and is fixedly mounted to the bucket 50 at one end and to the interrupt bar 55 at the other. Energization of the actuator 45 advances the interrupt bar 55 out of the recess 200 to a position adjacent the cutting edge 53, where it is interposed between the bucket 50 and the ground. Bottom wall 210 acts to protect the actuator 45 from clogging by dirt and debris, as well as from impact damage and the like.

In other embodiments, the grade predetermination function of the microprocessor may be replaced by a mechanical grade indicator, such as a string, line or surface, and the microprocessor voltage or signal generation function may be replaced mechanically, such as by a contact switch or control armature or member.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

I claim:

1. An apparatus for controlling the depth of a hoe bucket, comprising:
   a hoe bucket defining a cutting edge;
   an elongated member operationally connected to the bucket;
   an actuator operationally connected to the elongated member;
   an electronic controller operationally connected to the actuator;
   a position sensor operationally connected to the cutting edge and operationally connected to the electronic controller;
   wherein the actuator may be energized to pivot the elongated member to a position adjacent the cutting edge for engaging ground; and
   wherein positioning of the elongated member adjacent the cutting edge prevents the cutting edge from digging ground.

2. The apparatus of claim 1 wherein the elongated member is pivotably connected to the bucket.

3. The apparatus of claim 1 and further comprising a recess formed in the bucket, and wherein the actuator is substantially positioned in the recess.

4. The apparatus of claim 1 wherein the actuator further comprises a hydraulic pump; and a hydraulic cylinder connected in hydraulic communication with the hydraulic pump; wherein the hydraulic cylinder is operationally connected to the elongated member.

5. The apparatus of claim 1 wherein the actuator further comprises a pneumatic pump; and a pneumatic cylinder connected in pneumatic communication with the pneumatic pump; wherein the pneumatic cylinder is operationally connected to the elongated member.

6. The apparatus of claim 1 wherein the position sensor is a GPS transceiver.

7. The apparatus of claim 1 and further comprising a reference signal operationally connected to the microprocessor.

8. A system for automatically preventing overdigging with a mechanical shovel, comprising:
   a microprocessor;
   a sensor operationally connected to the microprocessor for measuring the position of a shovel bucket relative to grade;
   a movable interrupt bar for blocking the shovel bucket; and
   an actuator for moving the interrupt bar operationally connected to the microprocessor and to the interrupt bar;
   wherein the microprocessor is programmable with predetermined desired grade parameters;
   wherein the microprocessor is programmable to compare a measured bucket position to programmed grade parameters; and
   wherein the microprocessor is programmable to send a signal to the actuator to move the interrupt bar between the shovel bucket and ground when the shovel bucket begins to exceed programmed grade parameters.

9. The apparatus of claim 8 wherein the interrupt bar is pivotably connected to the bucket.

10. The apparatus of claim 8 and further comprising a recess formed in the bucket, and wherein the actuator is substantially positioned in the recess.

11. The system of claim 8 wherein the sensor is a GPS transceiver.

12. The system of claim 8 wherein the interrupt bar is a generally cylindrical member pivotably connected to the shovel bucket.

13. The system of claim 8 wherein the shovel bucket is a track hoe bucket.

14. The system of claim 8 wherein the shovel bucket is a skid loader bucket.

15. A method for preventing overdigging and maintaining grade with a mechanical hoe, comprising:
   a) programming an electronic controller with desired grade parameters;
   b) receiving depth information regarding a hoe bucket by electronic controller;
   c) calculating whether the hoe bucket is below grade;
   c) sending a first signal from electronic controller to hydraulic pump when the bucket is below grade;
   d) moving an interrupt bar to block the hoe bucket into response to the first signal;
   e) sending a second signal from electronic controller to hydraulic pump when the bucket is above grade;
   f) moving the interrupt bar to unblock the hoe bucket in response to the second signal;
   wherein the interrupt bar is movably connected to the bucket.

16. The method of claim 15 wherein the position information is received by a GPS transceiver.

17. The method of claim 15 wherein the actuator assembly includes a hydraulic pump operationally connected to the electronic controller and a hydraulic cylinder operationally connected to the interrupt bar and to the hydraulic pump.

* * * * *